United States Patent [19]

Aviram et al.

[11] 4,413,266

[45] Nov. 1, 1983

[54] METHOD AND APPARATUS FOR ERASING INK JET PRINTING

[75] Inventors: Ari Aviram, Yorktown Heights, N.Y.; Zalata Kovac, Holzgerlingen, Fed. Rep. of Germany; Robert A. Myers, New York, N.Y.

[73] Assignee: International Business Machines Corporation, Armonk, N.Y.

[21] Appl. No.: 330,299

[22] Filed: Dec. 14, 1981

[51] Int. Cl.$^3$ .................................... G01G 15/16
[52] U.S. Cl. ........................ 346/21; 106/22; 252/105; 252/188.23; 346/75; 346/140 R; 400/126; 400/696
[58] Field of Search ............... 346/75, 140 R, 21, 1.1; 400/126, 696; 8/107; 106/22; 252/105, 188.3 R, 188.23

[56] References Cited

U.S. PATENT DOCUMENTS 4,108,960  8/1978  Leigh ..................... 252/188.23 X
4,156,657  5/1979  Lin ........................... 252/188.3 R

FOREIGN PATENT DOCUMENTS 55-48006  6/1980  Japan .
56-40577  4/1981  Japan .

OTHER PUBLICATIONS

Cooper, L. M.; Single Line Correctable Display for Ink Jet Printer, IBM TDB, vol. 21, No. 3, Aug. 1978, pp. 1111-1112.

Bingham et al.; Display Device for a Typewriter; IBM TDB, vol. 21, No. 4, Sep. 1978, p. 1535.
Sachdev et al.; Dyes for Jet Printing Inks, IBM TDB, vol. 23, No. 12, May 1981, p. 5551.
Edds et al.; Correction Mechanism for Ink Jet Typewriters, IBM TDB, vol. 24, No. 4, Sep. 1981, pp. 1811-1814.

Primary Examiner—Joseph W. Hartary
Attorney, Agent, or Firm—Yen S. Yee

[57] ABSTRACT

The technology encompassed by the practice of this invention includes apparatus for ink jet printing under the control of electronic circuitry and ink jet printing under the control of an operator, for example, a typewriter. Broadly, the technology presented in accordance with the principles of this invention utilizes an ink eradicator which removes indicia of the ink by chemical reaction. The character of the eradicator fluid is such that another fluid may be utilized either together therewith or separately to neutralize the residue from the chemical reaction so that printing can readily be accomplished in the location where erasure has occurred. Specifically, practice of this invention is contemplated with means that applies the eradicator fluid over the location on a surface where printing has occurred by ink jet droplets as well as over an entire area thereon within which there is ink jet printing for which a change is to be achieved. For exemplary embodiments of this invention, the eradicator fluid is applied by a wick from a reservoir and the chemical reaction is enhanced by heating the location for the erasure by an external heating means.

6 Claims, 5 Drawing Figures

METHOD AND APPARATUS FOR ERASING INK JET PRINTING

DESCRIPTION

Technical Field

This invention relates to ink jet printing and especially to erasure thereof in an operator controlled ink jet printing mechanism.

Background of the Invention

One of the deficiencies of ink jet printing is the lack of satisfactory correction capability. A satisfactory erasure system would be particularly advantageous in an ink jet typewriter. The basis of the invention is to chemically reduce the dye in the ink.

The ink currently used in a known ink jet typewriter is based on Direct Black 19 dye. This is an azo dye that contains four azo groups as shown in the following formula:

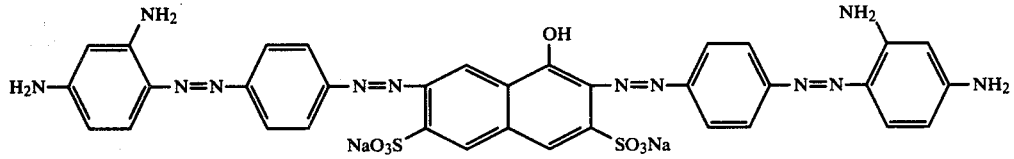

Disclosure of Invention

It is a principal object of this invention to provide a method and an apparatus for removing marks from paper which have been made thereon by an ink jet printer.

It is an object of this invention to provide a bleaching or reducing agent to effect the erasure of ink markings on substrates by bleaching or reducing the dye thereof.

It is another object of this invention to provide for erasure of ink jet printing of azo type dye by a reducing or bleaching agent comprised of a solution of sodium dithionite ($Na_2S_2O_4$ or $Na_2S_2O_4H_2O$) in aqueous hydrazine, for example, 96% hydrazine.

It is also another object of this invention to provide an improved ink jet printer having a reducing agent for erasure of ink jet printing with a soluble dye.

It is yet another object of this invention to provide in the ink jet printer of said latter object a means for applying said reducing agent to said dye printing comprising: a means for containing a volume of said reducing agent and means for controllably applying an amount of said volume to said print.

Generally, the technology encompassed by the practice of this invention includes apparatus for ink jet printing under the control of electronic circuitry and ink jet printing under the control of an operator, for example, a typewriter. Broadly, the technology presented in accordance with the principles of this invention utilizes an ink eradicator which removes indicia of the ink by chemical reaction. The character of the eradicator fluid is such that another fluid is utilized either together therewith or separately to neutralize the residue from the chemical reaction so that printing can readily be accomplished in the location where erasure has occurred. Specifically, practice of this invention is contemplated with means that applies the eradicator fluid over the location on a surface where printing has occurred by ink jet droplets as well as over an entire area thereon within which there is ink jet printing for which a change is to be achieved. For exemplary embodiments of this invention, the eradicator fluid is applied by a wick from a reservoir and the chemical reaction is enhanced by heating the location for the erasure by an external heating means.

In greater detail, the basis of the invention is to chemically reduce the dye in the ink of ink jet printing. An exemplary ink therefor is Direct Black 19 dye which is an azo dye that contains four azo groups as shown in the formula:

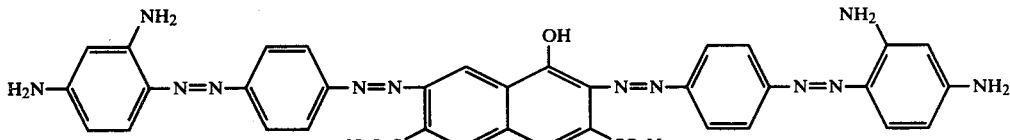

Azo groups are reduced to amines. When the azo group is part of a conjugated system, as in the noted Direct Black 19 dye, the reduction reaction prevents conjugation and destroys the chromophor which results in bleaching.

A powerful reducing solution is formulated for the practice of this invention that bleaches out Direct Black dye 19 ink on paper. The formulation consists of a saturated solution of sodium dithionate ($Na_2S_2O_4$) in 96% aqueous hydrazine which erases the print at room temperature. The erasure is considerably accelerated when the dye is heated to the range of 60° C. to 80° C. Traces of residual faint yellow material can easily be removed, for example, with a wet sponge.

In exemplary embodiment for the practice of this invention is a wick in conjunction with an actuator which moves with the paper to the place where erasure is desired. A second wick moistened with neutralizer, such as water, may be added if clean-up is utilized. Heat can easily be applied by heating the erase wick by a small platen moved against the paper or by a small lamp or by a laser.

DESCRIPTION OF THE PREFERRED EMBODIMENTS

Figure 1:
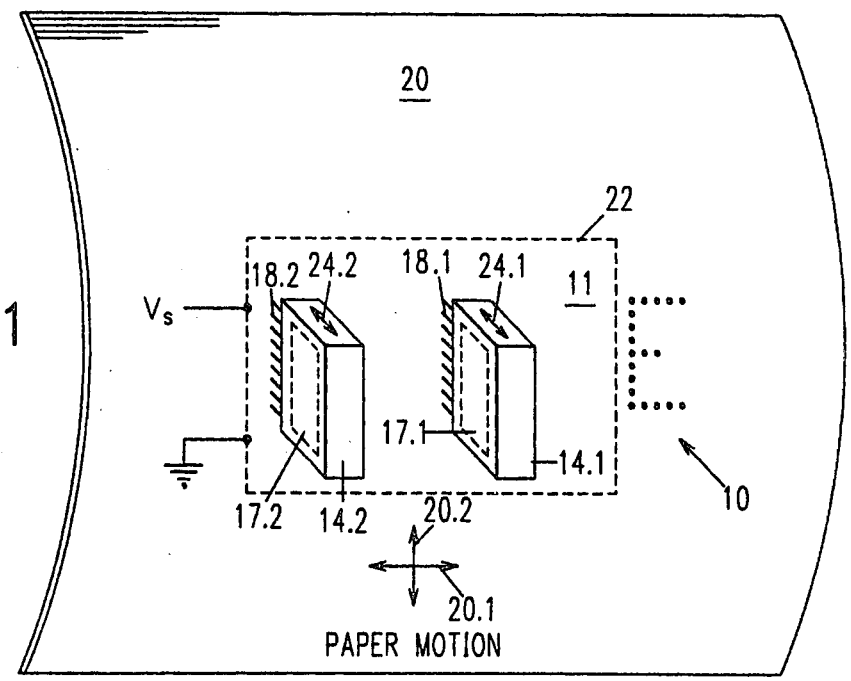
FIG. 1 presents a schemtic drawing of one embodiment of this invention in which ink erasure means is included in an ink jet typewriter such that, in an area in which an erroneous character has been printed, every element in the field thereof has the erasure fluid applied thereto.

The embodiment of this invention shown in FIG. 1 obtains erasure at a required area of the paper, upon which ink jet printing has been printed, by the typewriter operator causing the paper to appear at another location whereat the principles of this invention are practiced.

The principles of this invention will first be explicated with reference to FIG. 1 which shows an embodiment of this invention in which a character established on a sheet of paper by ink jet printing is erased by dots. Illustratively for ink jet printing by dots, a character, e.g., E is established on the paper by a stream of ink droplets by outlining it with a plurality of dots at selected positions of a matrix of given dimensions, e.g., a rectangular matrix of 9 vertical and 5 horizontal positions. The area covered by the entire matrix is termed the field of the character. Illustratively the letter E designated by number 10 is shown in FIG. 1 established by upper and lower horizontal lines of 5 dots, a vertical line of 9 dots, and an intermediate horizontal line of 3 dots. The manner in which letter E is erased will now be described.

Paper 20 is articulated by horizontal motion 20.1 and vertical motion 20.2 so that the field of letter E and the field of wicks 18.1 are congruent. Thereafter, erasure head 14.1 is articulated towards paper 20, and the requisite chemical reaction ensures to bleach the indicia of the ink print in areas where 18.1 wicks make contact with paper 20 within field 11. Once the erasure fluid flows from wicks 18.1 in sufficient amount for erasure onto said areas within field 11, erasure head 14.1 is returned to its starting position and moved sufficiently horizontally, so that neutralizer head 14.2 is articulated for congruence of its wicks 18.2 on said areas within field 11. The erasure head 14.1 includes a housing which contains a chamber within which the erasure fluid 17.1 is maintained as a reservoir. Erasure head 14.1 has mounted securely thereon one or more erasure wicks 18.1, for the potential character within the writing area for erasure.

Wicks 18.1 and 18.2 may be made of polymeric fibers or nylon sticks or other suitable material moistened with the reducing agent referred to hereinabove, and water, respectively. Alternatively, such wicks 18.1 and 18.2 may be constructed using commercially readily available fibers nibs. For instance, fiber nibs with reference numbers EK018G, CA8010, CA9030 and others made by Teibow Hanbai Co., Ltd., Tokyo, Japan, may be incorporated as wicks 18.1 and 18.2 in the present embodiment.

In the operation of the embodiment of FIG. 1, the local area of letter E is warmed by heating means 22 located behind paper 20. The particular temporal zone in the erasure cycle for heating the field 11 of letter E is determined by practical considerations, the essential requirement is that the ink and the erasure fluid be conjointly heated sufficiently to enhance the chemical reaction therebetween for the level of erasure required.

Once the operator observes an error in a character established in field 11, e.g., a letter E is printed rather than an intended number 4, paper 20 is articulated.

Neutralizer head 14.2 is identical in construction with erasure head 14.1, but contains neutralizer fluid 17.2 instead of erasure fluid 17.1. After erasure head 14.1 has been articulated into position, and the erasure wicks 18.1 deposit an appropriate amount of erasure fluid 17.1 upon the ink of letter E and the rest of field 11 it is removed along path 24.1 so that neutralizer head 14.2 can be placed into contact with the same area in the same wick orientation along path 24.2.

The mechanisms for moving either erasure head 14.1 or neutralizer head 14.2 are in accordance with known movement mechanisms for the purpose described. Illustratively, these motions and mechanisms therefore as well as mechanisms for causing the paper 20 to be placed in position for erasure by motions 20.1 and 20.2 are in accordance with standard books, e.g., "Ingenious Mechanisms for Designers and Inventors," Volumes 1 to 4, The Industrial Press, 1930. Further, known typewriters are readily adapted by one of ordinary skill in the art to achieve the motions 20.1, 20.2, 24.1 and 24.2.

Figure 2:
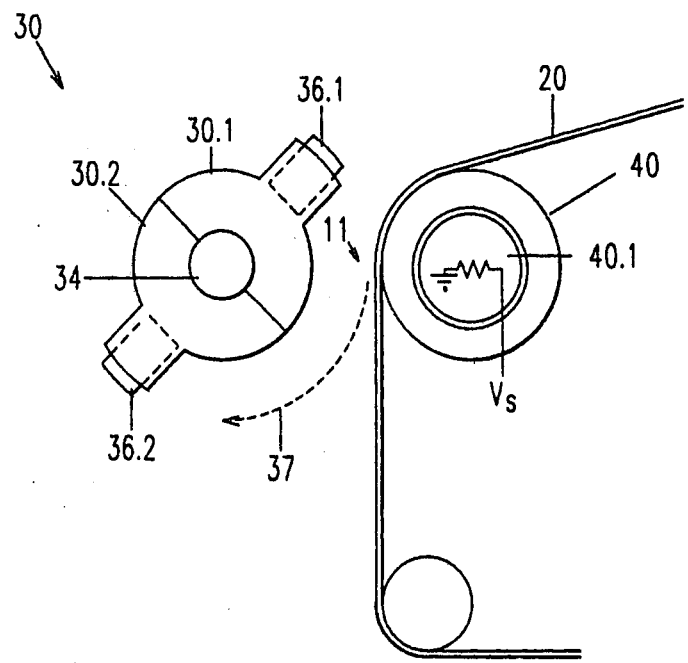
FIG. 2 is a schematic diagram of another embodiment of this invention with a heating member on the opposite side of the paper, in which an erasure wick is mounted on a rotating member to be articulated into washing contact with the paper that is to be erased followed by washing contact of a wick with neutralizer therein so that the area can be reprinted.

FIG. 2 presents another embodiment of this invention in which the erasure head 14.1 and neutralizer head 14.2 are replaced by unit 30 having portions 30.1 for erasure and 30.2 for neutralzer. Portions 30.1 and 30.2 are mounted on shaft 34 so that wick 36.1 for erasure can be articulated onto character field 11 in a washing motion to deposit thereat an appropriate amount of earasure fluid. Thereafter neutralizer portion 30.2 is articulated by circumferential motion onto the same field 11 so that neutralizer wick 36.2 deposits an appropriate amount of neutralizer upon the field 11. The heater 22 depicted in FIG. 1 is replaced in FIG. 2 by heated platen 40 with internal heater shaft 40.1 about which the platen 40 moves while erasure wick 36.1 deposits an appropriate amount of erasure fluid on field 11 to erase any character thereat. Both the erasure wick 36.1 and neutralizer wick 36.2 are a bundle of polymeric fibers made of nylon or polyacrylate. The circumferential motion 37 of wicks 36.1 annd 36.2 onto field 11 are accomplished under the control of the ink jet printer operator after the field 11 of paper 20 has been articulated into position for erasure and neutralizing thereby.

Figure 3:
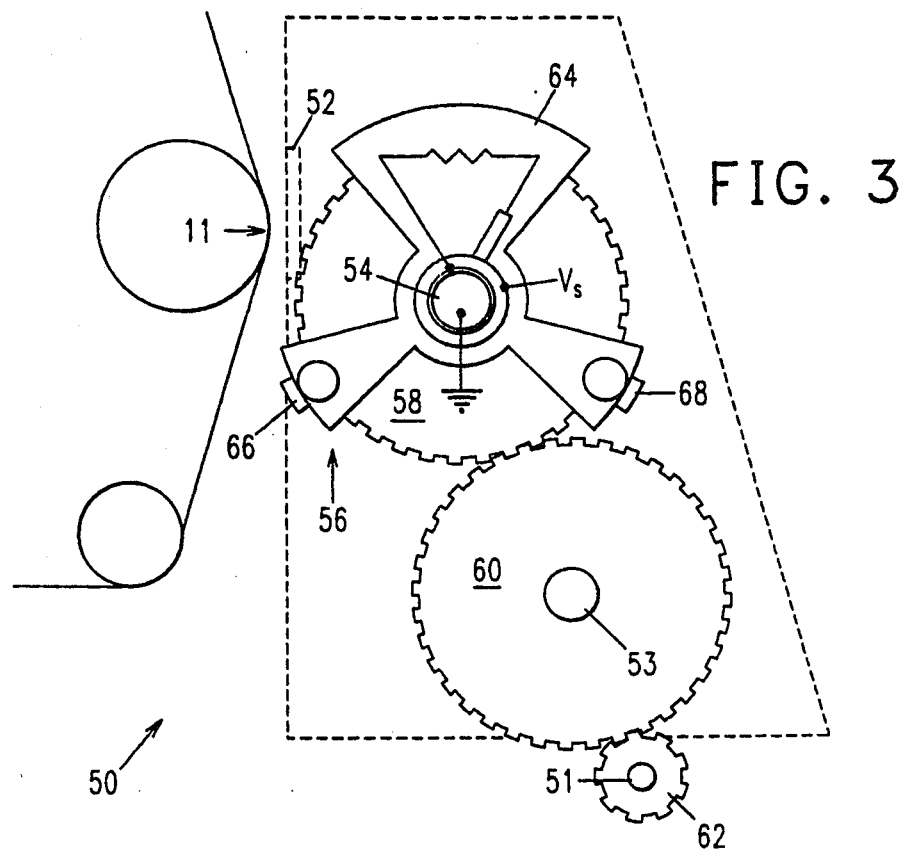
FIGS. 3 and 5 together depict another embodiment of this invention for erasing ink jet printing showing an erasure structure in an ink jet typewriter which includes an erasure wick, a neutralizer wick and a heater member such that the erasure wick is articulated in circumferential motion onto the area of the paper to be erased, followed by the heater member thereat to increase the chemical reaction rate, followed by the neutralizer wick.
Figure 4:
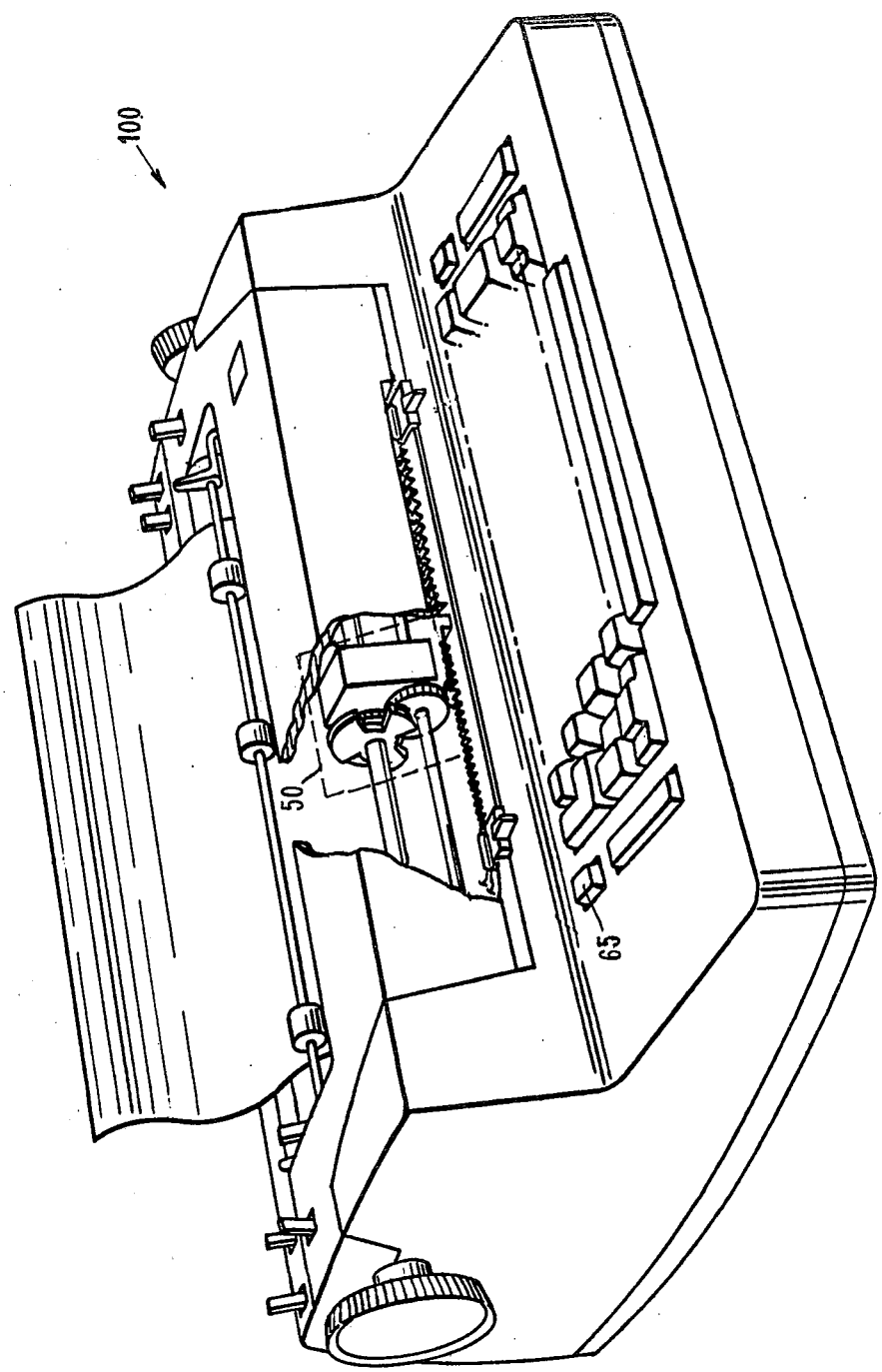
FIG. 4 is a perspective of an ink jet typewriter in accordance with the principles of this invention.

Another embodiment of this invention, and one preferred for the practice thereof, is presented in FIG. 3 wherein the erasure and neutralizer and heater mechanisms are incorporated with the ink jet printer head in conjunction with an ink jet typewriter. An ink jet typewriter 100 modified to provide ink jet printing with which the embodiment 50 according to the present invention is shown in FIG. 4. The embodiment 50 of FIGS. 3 and 4 has an ink jet printing head 52 driven into printing position by shaft 54 in the nature of a spiral gear which is indexed to effect printing upon a field 11. Attached to the ink jet 52 housing is an erasure mechanism 56 which incorporates a first gear 58, a second gear 60 and a shaft gear 62.

Figure 5:
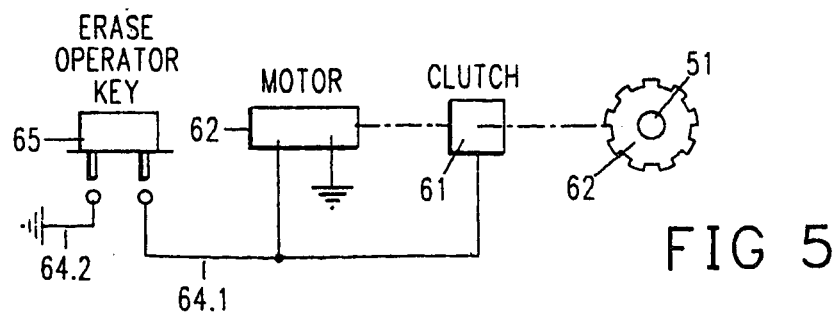

Referring to FIG. 5, shaft gear 62 is operated by motor 62 actuated by control lines 64.1 and 64.2 upon a pressing of erase key 65 which is under the control of the typewriter operator in accordance with the design of the ink jet typewriter. The ink jet head 52 may be any one of known designs, for example, it may be any jet stream or a drop on demand head. The operations of the erasure unit are described next.

Character information is detected in field 11 by the operator, and the entire unit 50 is moved somewhat so that the erasure portion is articulated into the system at the location of field 11. Thereafter heater unit 64 is rotated in brushing contact with the paper 20 at field 11 to warm the ink so that erasure wick containing erasure fluid at erasure unit 66 washes the surface of field 11 effecting a bleaching of the ink thereat, subsequently the neutralizer unit 68 is articulated into washing contact with field 11 to establish field 11 again in condition to receive printing. The articulation of said units 64, 66 and 68 in context of field 11 is accomplished by drive gear 62 causing intermediate gear 60 to drive the first gear 58 upon which heater unit 64, erase unit 66 and neutralizer unit 68 are mounted. Intermediate gear 60 is supported upon shaft 53 and is mounted via head unit 52 in accordance with the positioning mechanism of the typewriter. The operator presses erase key 65 (FIGS. 4 and 5) thereby activating motor 62, via lead 64.1 and 64.2, which engages clutch 61, and rotates drive gear shaft 51 to articulate erase unit 66 into position at field 11. Effectively the positioning of ink jet head 52 is utilized to position the erasure mechanism 56.

The exemplary ink utilized in the above-described embodiments is Direct Black 19 dye. The exemplary erasure fluid used is a saturated solution of sodium dithionate ($Na_2S_2O_4$) in 96% aqueous hydrazine, and an exemplary neutralizer is water, as stated hereinabove.

While the present invention has been shown and described to be useful together with Direct Black 19 dye, other suitable azo dyes that contain azo groups as shown in the formula described hereinabove may also be incorporated in the practice of of the present invention. As an illustration, azo group Direct Dyes with C.I. numbers 5220, 5225, 5230, 5240, and others as shown and described in *Colour Index*, Third Edition, Vols. 2 1 and 4, The Society of Dyers and Colourists and The American Association of Textile Chemists and Colorists, Research Triangle Park, N.C. 27709, may also be applicable in the practice of the present invention.

Although the present invention is shown and described together with a particular reducing solution formulation consisting of a saturated solution of sodium dithionate ($Na_2S_2O_4$) in 96% aqueous hydrazine, other suitable reducing agents may also be applicable. For instance, reducing agents such as those with C.I. numbers 1, 1:1, 1:2, 1:3, 1:4, 2, 4, 6, 9 and others as shown and described in *Colour Index*, Third Edition, pages 3561–3562, Vol. 3, The Society of Dyers and Colourists and The American Association of Textile Chemists and Colorists, Research Triangle Park, N.C. 27709, may also be applicable in the practice of the instant invention.

From the preceding detailed description of applicants' invention, it is seen that ink jet typewriters and printers incorporating the erasure feature and method in accordance with the teachings of the present invention have advantages heretofore not possible to achieve. In addition to the variations and modifications of applicants' disclosed apparatus and methods which have been suggested, many other variations and modifications will be apparent to those skilled in this art, and accordingly the scope of applicants' invention is not to be construed to be limited to the particular embodiments shown or suggested.

Having thus described our invention, what we claim as new, and desire to secure by Letters Patent is:

1. In an ink jet printer wherein ink droplets are utilized to form indicia on a paper medium, the improvement comprising:
   said ink is based on an azo dye; and
   means for selective erasure of said indicia including:
      means for chemically reducing said indicia in a selected area on said paper medium;
      means for warming said indicia in said selected area to enhance the erasure of said indicia by said reducing means; and
      means for neutralizing said area to establish said area in condition again to receive ink droplets forming other indicia.

2. In an ink jet printer as set forth in claim 1 wherein said reducing means is a solution of sodium dithionate ($Na_2S_2O_4$) in 96% aqueous hydrazine, and said ink is based on Direct Black 19 dye.

3. In an ink jet printer as set forth in claim 2 wherein said neutralizing means includes a wick moistened with a neutralizer, such as water.

4. A method for erasing indicia formed by ink droplets contacting a paper medium in an ink jet printer comprising the steps of:
   providing an azo dye containing ink for producing said ink droplets and forming said indicia;
   erasing selectively said indicia in an area using a reducing solution;
   warming said indicia in said area to enhance the erasure of said indicia in said area by said reducing solution; and
   neutralizing said area to establish said area in condition again to receive ink droplets forming other indicia.

5. A method for erasing indicia as set forth in claim 4 wherein said reducing solution is a solution of sodium dithionate ($Na_2S_2O_4$) in 96% aqueous hydrazine, and said ink is based on Direct Black 19 dye.

6. A method for erasing indicia as set forth in claim 5 wherein said neutralizing step is performed by a wick moistened with a neutralizer such as water.

* * * * *